(12) United States Patent
Taege et al.

(10) Patent No.: US 12,234,188 B2
(45) Date of Patent: Feb. 25, 2025

(54) PERMEABLE PAVEMENT SYSTEM INCLUDING A PERMEABLE PAVEMENT COMPOSITION AND A RELATED METHOD

(71) Applicants: The Boeing Company, Arlington, VA (US); Washington State University, Pullman, WA (US)

(72) Inventors: Deborah Ann Taege, Maple Valley, WA (US); Somayeh Nassiri, Pullman, WA (US); Karl Richard Englund, Moscow, ID (US); Kun Zhang, Chico, CA (US); Justin Yune-Te Lim, Renton, WA (US)

(73) Assignees: THE BOEING COMPANY, Arlington, VA (US); WASHINGTON STATE UNIVERSITY, Pullman, WA (US)

( * ) Notice: Subject to any disclaimer, the term of this patent is extended or adjusted under 35 U.S.C. 154(b) by 0 days.

(21) Appl. No.: 18/480,208

(22) Filed: Oct. 3, 2023

(65) Prior Publication Data
US 2024/0043329 A1 Feb. 8, 2024

Related U.S. Application Data

(63) Continuation of application No. 16/832,846, filed on Mar. 27, 2020, now Pat. No. 11,807,578.
(Continued)

(51) Int. Cl.
*C04B 20/00* (2006.01)
*C04B 18/167* (2023.01)
(Continued)

(52) U.S. Cl.
CPC ........ *C04B 20/0068* (2013.01); *C04B 18/167* (2013.01); *C08J 5/042* (2013.01);
(Continued)

(58) Field of Classification Search
CPC ............ C04B 20/00; C04B 2111/0028; C04B 2111/4343; C04B 2201/50; B28B 3/02;
(Continued)

(56) References Cited

U.S. PATENT DOCUMENTS 11,807,578 B2 * 11/2023 Taege .................... E01C 11/226
2018/0057406 A1 * 3/2018 Englund .................. B28B 3/02

FOREIGN PATENT DOCUMENTS

| CN | 105862542 A | 5/2017 |
| CN | 108455900 A | 8/2018 |
| WO | 2018037375 A1 | 3/2018 |

OTHER PUBLICATIONS

Rangelov, M., et al., "Using carbon fiber composites for reinforcing petVious concrete," Construction and Building Materials, 2016, pp. 875-885.

* cited by examiner

*Primary Examiner* — Camie S Thompson
(74) *Attorney, Agent, or Firm* — MH2 TECHNOLOGY LAW GROUP LLP (57) ABSTRACT

A permeable pavement system including a permeable pavement composition and a related method are provided. The permeable pavement system includes a first layer of a permeable pavement composition including a quantity of a first permeable pavement material and a quantity of cured carbon fiber composite material (CCFCM) incorporated therewith, the first layer defining a first surface; and a second layer of a second permeable pavement material deposited over a substantial entirety of and covering the first surface of the first layer of the permeable pavement composition, wherein the first layer interfaces with the second layer to at least strengthen the permeable pavement system.

20 Claims, 7 Drawing Sheets

Related U.S. Application Data (60) Provisional application No. 62/835,395, filed on Apr. 17, 2019.

(51) Int. Cl.
    *C04B 111/00*      (2006.01)
    *C04B 111/34*      (2006.01)
    *C08J 5/04*      (2006.01)
    *E01C 7/30*      (2006.01)
    *E01C 7/32*      (2006.01)

(52) U.S. Cl.
    CPC ................. *E01C 7/30* (2013.01); *E01C 7/32* (2013.01); *C04B 2111/00284* (2013.01); *C04B 2111/343* (2013.01); *C04B 2201/50* (2013.01); *C08J 2300/30* (2013.01)

(58) Field of Classification Search
    CPC ......... B28B 11/24; B28B 11/243; B28C 5/40; E01C 7/14; E01C 7/142; E01C 7/30; E01C 7/32; C08J 5/042; C08J 2300/30
    USPC .................. 428/294.7, 296.1; 404/17, 31, 35
    See application file for complete search history.

PERMEABLE PAVEMENT SYSTEM INCLUDING A PERMEABLE PAVEMENT COMPOSITION AND A RELATED METHOD

CROSS-REFERENCE TO RELATED APPLICATIONS

This application claims priority from U.S. Provisional Application No. 62/835,395, entitled: A Permeable Pavement System Including a Permeable Pavement Composition and a Related Method, filed on Apr. 17, 2019. This continuation application claims priority to U.S. Ser. No. 16/832,846 filed Mar. 27, 2020, which is incorporated by reference in its entirety.

CO-PENDING APPLICATIONS

The present patent application is co-pending with U.S. patent application Ser. No. 15/639,678, filed Jun. 30, 2017.

TECHNOLOGICAL FIELD

The present disclosure relates generally to reinforced permeable pavement systems. More particularly, the present disclosure relates to a permeable pavement system including a permeable pavement composition and a related method for enhanced mechanical properties and durability.

BACKGROUND

Strong and non-erodible base course and subgrade soil supports are beneficial for structural performance of permeable pavements. In non-reinforced permeable pavements (e.g., those made with porous asphalt, pervious concrete, etc.), distresses (or defects) may result from the lack of a sufficient non-erodible base course or subgrade layers (lower layer). Such distresses include, for example, permanent deformation (or rutting) in porous asphalt, cracking, faulting (or slab rocking), corner breaks, etc. Repair of distresses can be costly and time and labor intensive; especially distresses that originate in the base course or subgrade layers.

Therefore, a need exists for constructing strong and durable base course(s) or subgrade layer(s) underneath a wearing course (upper layer) in order to delay the deterioration rate and extend the service life of permeable pavements.

BRIEF SUMMARY

Example implementations of the present disclosure are directed to a permeable pavement system including a permeable pavement composition and a related method. Example implementations provide a permeable pavement system having improved characteristics in terms of durability, wear, workability during placement, and variability as compared with other permeable pavement systems including non-reinforced materials and/or other traditional pavement materials.

The present disclosure provides in one example implementation, a permeable pavement system comprising: a first layer of a permeable pavement composition including a quantity of a first permeable pavement material and a quantity of cured carbon fiber composite material (CCFCM) incorporated therewith, the first layer defining a first surface; and a second layer of a second permeable pavement material deposited over a substantial entirety of the first surface of and covering the first layer of the permeable pavement composition, wherein the first layer interfaces with the second layer to at least strengthen the permeable pavement system.

The present disclosure also provides in another example implementation, a method of making a permeable pavement system comprising: depositing a first layer of a permeable pavement composition including a quantity of a first permeable pavement material and a quantity of cured carbon fiber composite material (CCFCM) incorporated therewith, the first layer defining a first surface; and depositing a second layer of a second permeable pavement material over a substantial entirety of the first surface of and covering the first layer of the permeable pavement composition, wherein the first layer interfaces with the second layer to at least strengthen the permeable pavement system.

It will therefore be appreciated that the above Summary is provided merely for purposes of summarizing some example implementations so as to provide a basic understanding of some aspects of the disclosure. As such, it will be appreciated that the above described example implementations are merely examples of some implementations and should not be construed to narrow the scope or spirit of the disclosure in any way. It will be appreciated that the scope of the disclosure encompasses many potential implementations, some of which will be further described below, in addition to those here summarized. Further, other aspects and advantages of implementations disclosed herein will become apparent from the following detailed description taken in conjunction with the accompanying drawings which illustrate, by way of example, the principles of the described implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Figure 1:
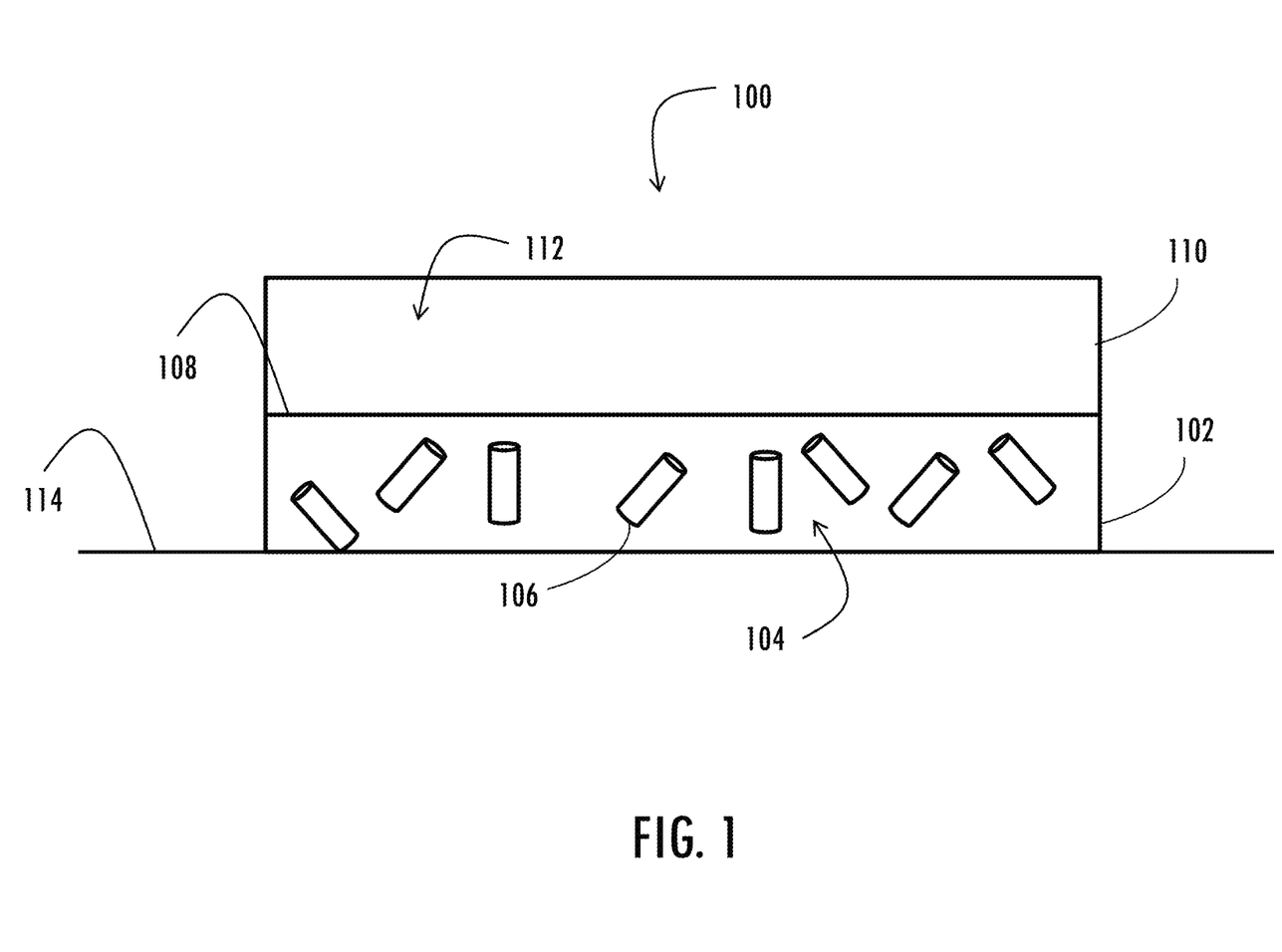
FIG. 1 illustrates a permeable pavement system according to some example implementations of the present disclosure.

Example implementations of the present disclosure are generally directed to a permeable pavement system including a permeable pavement composition and a related method. As illustrated in FIG. 1, for example, a permeable pavement system, generally designated 100, comprises a first layer (e.g., a base course) 102 of a permeable pavement composition including a quantity of a first permeable pavement material 104 and a quantity of cured carbon fiber composite material (CCFCM) 106 incorporated therewith. The first layer defines a first surface 108. The permeable pavement system also comprises a second layer (e.g., a wearing course) 110 of a second permeable pavement material 112 deposited over a substantial entirety of the first surface of and covering the first layer of the permeable pavement composition (i.e., such that the first layer is not visible). As such, the first layer interfaces with the second layer to at least strengthen the permeable pavement system. FIG. 1 further illustrates that the permeable pavement system 100 is deposited on a surface 114, which is, for example, dirt, grass, gravel, clay, stone, sand, another similar surface, or any combination thereof.

The permeable pavement material 104, 112 is, in some example implementations, any type of traditional permeable pavement material such as a pervious concrete or a porous asphalt. However, the permeable pavement material, in some further example implementations, is another type of concrete and asphalt, or another similar permeable pavement material such as clay, gravel, any combination thereof, and the like. As noted herein, the terms "pervious", "permeable", "porous", and the like are synonymous when referenced with the term "pavement material" or "pavement."

In some example implementations, the type of permeable pavement material used in the permeable pavement system is dependent on the permeable pavement application. In some instances, for example, a porous asphalt material or a pervious concrete material is utilized as a permeable pavement material in applications where heavy snow fall or rain are common. Typical porous asphalt material and pervious concrete material include interconnected voids that allow excess snow or rain (stormwater) to be temporarily stored so as to reduce stormwater runoff and eliminate the need for retention ponds, swales, and other stormwater management devices. Regardless of the type of permeable pavement material 104, 112 used in the permeable pavement system 100, it is desirable to deposit the second layer 110 of the second permeable pavement material 112 over an entirety of or a substantial entirety of the first surface 108 of the first layer 102 of the permeable pavement composition so that the second layer covers the first layer and the first layer is not visible. Coverage of the first layer by the second layer so that the first layer is not visible results in the first layer interfacing with the second layer to at least strengthen the permeable pavement system.

As used herein, "strengthen" refers to the improvement of physical properties and functional performances of the permeable pavement system, as compared to other, non-reinforced permeable pavement systems, from the interface between the first layer 102 and the second layer 110. For example, strengthening of the permeable pavement system includes substantially preventing any compression of the second layer by traffic due to the incorporation of the CCFCM 106 with the first permeable pavement material in the first layer. In another example, strengthening of the permeable pavement system includes substantially preventing any extrusion of the CCFCM from the first layer due to coverage of the first surface 108 of the first layer with the second layer. A ratio of a thickness of the first layer 102 of the permeable pavement composition to a thickness of the second layer 110 of the second permeable pavement material 112 is variable depending on the application of the permeable pavement system. For example, in instances where traffic is heavy, but the vehicles are of a lower weight, the ratio of the thickness of the first layer of the permeable pavement composition to the thickness of the second layer of the second permeable pavement material will differ from instances where traffic is light, but the vehicles are of a heavier weight. Accordingly, the ratio of the thickness of the first layer of the permeable pavement composition to the thickness of the second layer of the second permeable pavement material is variable from ratios such as, for example, 1:1, 1:2, 1:3, 1:4, 2:1, 3:1, 4:1, and the like.

In some example implementations, the first permeable pavement material 104 and the second permeable pavement material 112 are the same or substantially the same material, or different materials. The first or second permeable pavement material is, depending on the application, a pervious concrete, a porous asphalt (e.g., an asphalt treated permeable base (ATPB)), or another similar permeable pavement material such as clay, gravel, any combination thereof, or the like. For example, in instances where heavy traffic is expected and/or ambient temperature is high, it is desirable to utilize pervious concrete as at least the first permeable pavement material if not both the first and second permeable pavement material due to pervious concrete's resistance to raveling and decreased heat retention as compared to porous asphalt. In another example, in instances where thin first and second layers is desired, it is desirable to utilize porous asphalt as at least the first permeable pavement material if not both the first and second permeable pavement material. This is because typically, porous asphalt is laid at a thickness of about three inches as compared to pervious concrete being typically laid at a thickness of about six inches.

As described herein, the strengthening of the permeable pavement system from the interface between the first layer 102 with the second layer 110 is due to, in part, the incorporation of the quantity of the CCFCM 106 with the first permeable pavement material 104. Incorporation of the CCFCM with the first permeable pavement material is considered a "reinforced" permeable pavement material as used herein. The first layer interfacing with the second layer to at least strengthen the permeable pavement system causes the permeable pavement system to exhibit improved physical properties, improved chemical compositions, improved functional performances, and the like (i.e., "improved characteristics"), when compared to, for example, traditional asphalt or concrete systems or non-reinforced asphalt or concrete systems.

More particularly, the improved characteristics comprise, for example, an increased or maintained split tensile strength, an improved or maintained modulus of elasticity, improved or maintained abrasion resistance, increased ductility, improved or maintained fatigue cracking resistance, improved or maintained low temperature cracking, and/or improved or maintained rutting resistance. Alternatively, or in addition to those described above, the improved characteristics can further comprise, for example, a maintained or decreased porosity, an increased or maintained filtration rate, and/or an increased or maintained compressive strength.

The improved characteristics can also comprise a reduction in toxicity, such that the permeable pavement systems disclosed herein are substantially non-toxic to aquatic and/or semi-aquatic life and aid in the mitigation of storm water pollutants. Such example improved characteristics allow the permeable pavement systems to be utilized in multiple applications, such as, transportation applications (e.g., bike lanes, pedestrian walkways, sidewalks, parking lots, roadways and others, etc.), as well as any other application where permeable pavement compositions are typically utilized.

As noted herein, in one example implementation, the first layer 102 comprises a permeable pavement composition, which includes at least a quantity of a first permeable pavement material 104 and a quantity of CCFCM 106 incorporated therewith. For example, in high-traffic applications, the first permeable pavement material of the first layer (base course) comprises pervious concrete, while the second permeable pavement material 112 of the second layer 110 (wearing course) comprises pervious concrete, porous asphalt, or another similar permeable pavement material. In such instances or other similar instances, the pervious concrete of the first layer is prepared as a mixture comprising cement, water, admixtures, and coarse aggregate. In some example implementations, little to substantially no fine aggregate is included in the pervious concrete mixture. One example pervious concrete mixture comprises a Type I/II ordinary Portland Cement Concrete (PCC) and saturated surface dry (SSD) crushed basalt coarse aggregate incorporated therewith and having a nominal maximum size of about ¼ inches to about ¾ inches, a specific gravity of about 2.00 to about 4.00, and about 2.5 to about 4.0 percent water absorption.

In some mixtures of pervious concrete, a certain percentage of the cement is replaced with secondary cementitious materials such as fly ash, slag, silica fume, and others in order to improve compressive strength, bond strength, and abrasion resistance of the pervious concrete. In one instance, about 15 percent of the cement by mass is replaced with Type F fly ash, although this percentage is variable between about 10 percent and about 40 percent of the cement by mass. The addition of fly ash is advantageous in improving compressive strength and water permeability of the pervious concrete, and reducing costs as less pervious concrete need be utilized. Water to cementitious ratio (w/cm) is achievable at, for example, about 0.15 to about 0.30 w/cm. However, the water to cementitious ratio is modifiable according to the pervious concrete mixture.

In some aspects, a rheology-modifying chemical admixture is used to delay the setting of the pervious concrete mixture, providing more workability time. For example, in one instance, approximately 583.0 ml of admixture is used. Additionally, in another example, the pervious concrete mixture is designed following a mixture design procedure. The mixture design procedure, in this example, follows a mixture design procedure available in ACI 522-R-10, using a target porosity of about 27 percent (i.e., about 27 percent air voids). Such a porosity as indicated in this mixture design procedure provides, in some instances, the optimum trade-off between compressive strength and permeability.

Accordingly, exemplary ranges for a permeable pavement composition of a first layer, such as the permeable pavement composition of the first layer 102 in FIG. 1, are provided below in TABLE 1, where ranges in proportioning of the quantity of the first permeable pavement material and the CCFCM are clearly set forth. In one exemplary aspect, a dosage or quantity of CCFCM added to the first permeable pavement material is about 0.0 to about 6.0 percent CCFCM by volume of the permeable pavement composition, although this dosage is variable.

TABLE 1

| First Permeable Pavement Material | Amount per $m^3$ of the first permeable pavement material |
| --- | --- |
| SSD Coarse aggregate [kg] | 1000-4000 |
| Fine aggregate [kg] | 0.0-200 |
| Water [kg] | 50-150 |
| Cement [kg] | 150-320 |
| Fly ash [%] | 10-40% replacement of cement within first permeable pavement material |
| Admixture [ml] | As needed |
| CCFCM [kg] | 0.0-100.0 (0.0-6.0 percent volume of the permeable pavement composition) |

In another example, in low-traffic applications, the first permeable pavement material of the first layer (base course) 102 instead comprises porous asphalt, while the second permeable pavement material 112 of the second layer 110 (wearing course) comprises pervious concrete, porous asphalt, another permeable pavement material, or any combination thereof. In such instances or other similar instances, the porous asphalt of the first layer is prepared as a mixture using the same methods as traditional asphalt but with little to substantially no fine aggregate included in the porous asphalt mixture. The porous asphalt mixture comprises a binder and an aggregate, which is incorporated with a quantity of CCFCM to produce an asphalt permeable pavement composition.

The aggregate comprises, for example, particles or elements such as stone, sand, gravel, and the like, while the binder comprises, for example, a crude oil blend, a nonpetroleum blend, and the like. In some aspects, the porous asphalt mixture is prepared from about a 95 percent aggregate and a 5 percent binder incorporated with about a three percent, about a six percent, or about a nine percent CCFCM per total weight of the asphalt binder. These values correspond to 0.15 percent CCFCM, about 0.30 percent CCFCM, or about 0.45 percent CCFCM per total weight of the asphalt permeable pavement composition. Other percentages of the binder to CCFCM dosage are also contemplated depending on the use application of the permeable pavement system.

In some example implementations, a quantity of the CCFCM (e.g., 106 in FIG. 1) is incorporated with a quantity of a first permeable pavement material to produce the permeable pavement composition of the first layer (e.g., 102 in FIG. 1). The quantity of the CCFCM incorporated with the quantity of the first permeable pavement material is dependent on the quantity of the first permeable pavement material (and vice versa), as well as various characteristics of the first permeable pavement material and the CCFCM. For example, more of the CCFCM may be added relative to a percent by weight of the permeable pavement composition, in high traffic applications to increase load capacity of the permeable pavement composition, while only moderately increasing stiffness.

In some instances, one or more components of the CCFCM comprise a polyacrylonitrile (PAN)-type carbon fiber or similar fiber and a binding polymer or matrix material such as a thermoplastic resin, e.g., an epoxy resin. In some other instances, some of the one or more components of the CCFCM are recycled or repurposed materials (e.g., waste synthetic fibers, waste carbon fiber composites (CFCs), and the like embedded in a matrix material), which includes undesirably large particle size fractions. Accordingly, one or more components of the CCFCM requires further processing and/or refinement to separate the components of the CCFCM into different particle size fractions. The CCFCM is, in some example implementations, processed and/or refined in any manner of ways. As disclosed herein, the processing and/or refining methods advantageously include low-energy methods that preserve the characteristics of the waste material components of the CCFCM. By contrast, known recycling or reuse methods may process and/or refine the waste material components in such a manner that is less environmentally preferred, inefficient, and/or expensive (e.g., a chemical solvent or burn processing method).

Initially, where one or more of the components of the CCFCM comprises a waste fiber material, it is desirable to separate elements of these components by reducing the size, removing cured resins, etc., in a manner that is not costly and is more environmentally preferred, i.e., is not a chemical and/or thermal process. As such, the elements of the CCFCM are separated by mechanical deconstruction such as shredding, hammering, milling, sieving, etc. In some example implementations, the elements of the CCFCM are separated by first shredding and are then refined using a mechanical refinement mechanism (e.g., a hammer-mill) through, for example, a 25.4-mm screen to separate out the coarsest particles.

In another example, the elements of the CCFCM are further separated into different particle size fractions relative to a weight by volume percentage of the permeable pavement composition in order to achieve properly graded classes of CCFCM for incorporation in a quantity of a first permeable pavement material. Such properly graded classes of CCFCM advantageously, in some aspects, are able to maintain required infiltration rates, yet maintain or have improved workability and mechanical properties.

Figure 2:
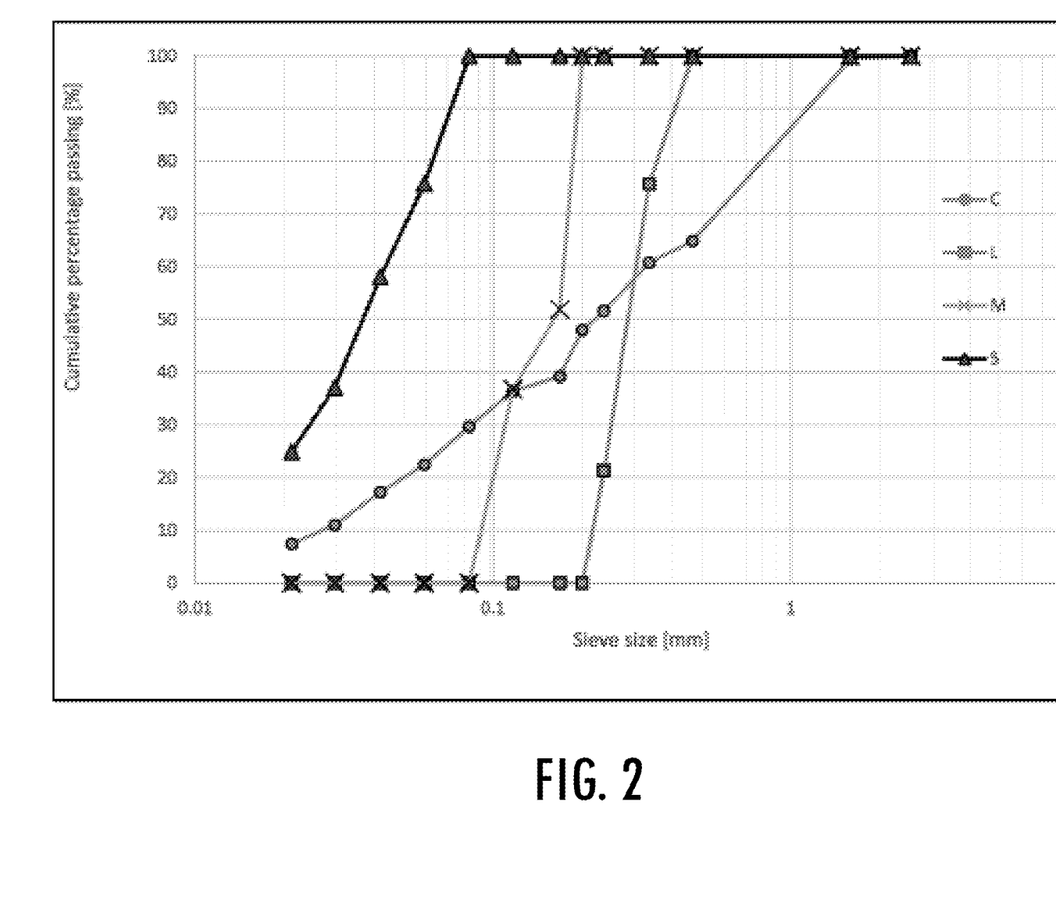
FIG. 2 illustrates a graphical representation of a particle size distribution of elements of cured carbon fiber composite material (CCFCM) according to some example implementations of the present disclosure.
Figure 3:
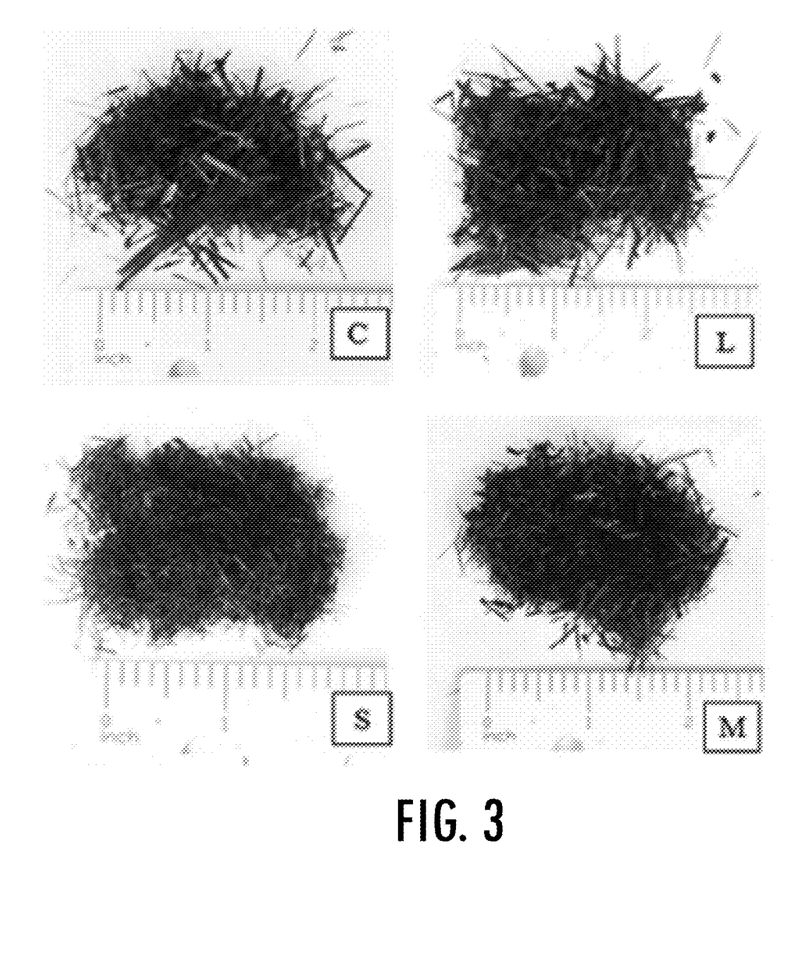
FIG. 3 illustrates four different particle size elements of CCFCM: C-combined, L-large, S-small, and M-medium according to some example implementations of the present disclosure.

In one instance, the elements of the CCFCM are differentiated into four different particle size fractions, though fewer or greater groupings are also contemplated, by further mechanical screening. FIG. 2 illustrates such an instance of four different particle size fractions, which include: (C) combined: particles smaller than about 3.35 mm, (L) large: particles smaller than about 3.35 mm and larger than about 2.00 mm, (M) medium: particles smaller than about 2.00 mm and larger than about 0.841 mm, and (S) small: particles smaller than about 0.841 mm (retained on the pan). In another instance, FIG. 3 illustrates four different particle size fractions. As seen in FIG. 3, coarse and flaky CCFCM particles are contained in C and L, while S and M mainly contained particles in the form of fibers. However, other combinations of graded classes and shapes are able to be used depending on processing methods, pavement designs, and/or required properties.

Consequently, the permeable pavement systems and related methods, as disclosed herein provide a secondary use in decreasing waste streams of fiber materials, specifically CFCs. Expenses traditionally associated with chemical and thermal treatments to isolate elements of the waste stream of fiber materials have proven to be prohibitive. As described herein, low-energy intensive repurposing strategies advantageously recycle a waste fiber material, while allowing the waste fiber material to retain much of its original properties and to be easily dispersed into many other materials, including pavement materials.

Example 1

An experiment was designed to determine the benefits of using aggregates with an asphalt treatment in a base course (first layer). Notably, production of an asphalt treated permeable base (ATPB) (e.g., the first permeable pavement material 104 in FIG. 1) is no different from production of hot mix asphalt (HMA). However, ATPB uses larger aggregates to provide stiffness and strength through interlocking and low amount of asphalt binder is used (about 3 percent) for stabilization. Since ATPB is about three times stronger than unbound aggregates, the required layer thickness of the base course was lowered. Although ATPB costs more than unbound aggregates, the overall cost effectiveness was improved through less need for excavation, and reduced repair and rehabilitation costs.

In addition to increased structural integrity, ATPB offers the advantage of high drainage. When HMA is exposed to moisture for a long period of time, bonding strength between the aggregates and binders are weakened. Binder stripping occurs as a result, which can further damage the pavement in the form of raveling or potholes. While ATPB uses dense graded aggregate gradation, use of open graded aggregate structure (e.g., ATPB) allows water to freely travel underneath the base course and reduce the time the wearing course (i.e., the second layer) is exposed to moisture.

In this experiment, CCFCM (e.g., CCFCM 106 in FIG. 1) was used as a reinforcing agent for the ATPB. The excess CCFCM was received from manufacturing lines of jets and planes and was downsized into fiber-like materials by mechanical processing. Other potential recycling methods for CCFCM are accomplished through the use of chemical solvents or burning; however, these methods require significant quantities of energy and degrades the quality of the CCFCM. In this experiment, the effects of CCFCM on the volumetric properties and infiltration rate of the ATPB were evaluated.

Aggregates and asphalt binder were collected from commercially available sources, such as Miles Resources in Lakewood, Washington. Aggregates were collected from two stockpiles: about 1¼ inches (") to about ½" and about ¾ " to about #4. Nominal maximum aggregate size used in the mixture was about one inch; although, other aggregate sizes are capable of being used. Despite the stockpile with larger sizes including aggregates sized of about 1¼ ", little to no aggregate was retained on a 1¼ " sieve during processing of the aggregates.

Figure 4:
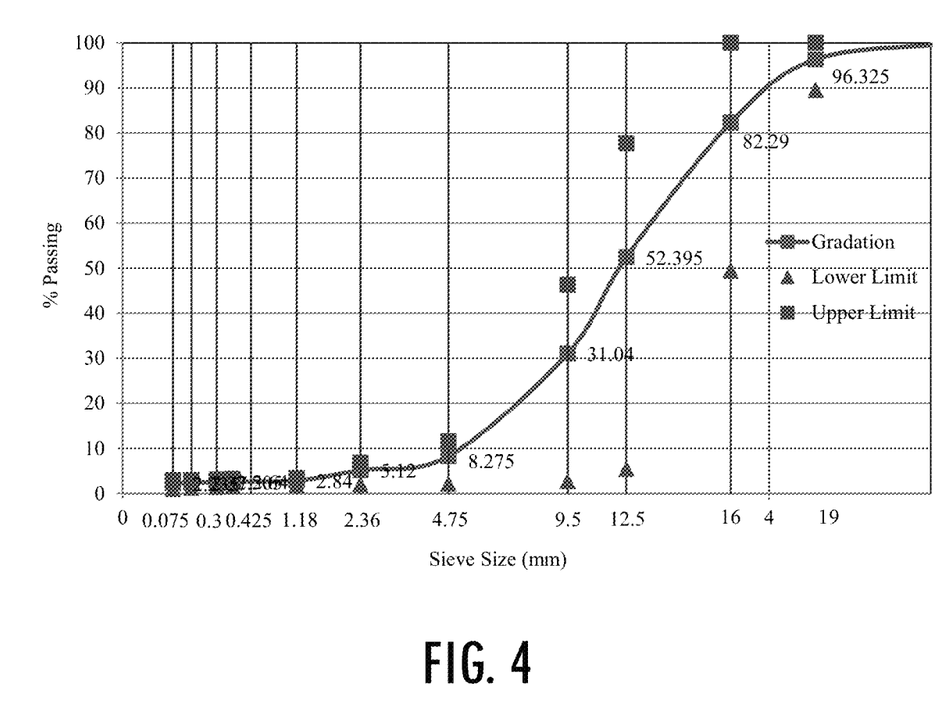
FIG. 4 illustrates a graphical representation of an aggregate gradation of an asphalt treated permeable base (ATPB) composition test specimen according to some example implementations of the present disclosure.

Obtained aggregates were dried and sieved to prepare for aggregate batching. Aggregate gradation used for ATPB is shown on FIG. 4. Upper and lower limits shown in FIG. 4 indicate the gradation of 1¼ " chip and ¾ " chip stockpiles, respectively. The required aggregate gradation for ATPB is similar to the required gradation for porous HMA. Both gradations have a designed nominal maximum aggregate size (NMAS) of ½ " and percent passing of finer aggregates (⅜" and #4 sieve) are similar for ATPB and porous hot mix asphalt (PHMA). Instead, this study used the obtained job mix formula with 1" NMAS.

A binder having a performance grade (PG) of 70-22ER was obtained. Use of polymer modification resulted in the binder mixture becoming stiffer with higher elastic recovery (ER) properties. Mixing and compaction temperature ranges of the binder were determined through a rotational viscosity (RV) test and were between about 328 degrees Fahrenheit (° F.) and about 339° F., and between about 307° F. and about 315° F., respectively. Mixing was conducted after the batched aggregates, the binder, and the mixing equipment were placed in the oven for around two hours at the mixing temperature. Loose mixtures were cooled down overnight and reheated the next day for around two hours at the compaction temperature along with compaction equipment prior to being compacted. Upon completion of the compaction, the ATPB test specimens were kept in the gyratory mold overnight.

The test specimens were unloaded after they had been completely cooled down. A superpave gyratory compactor was used with 75 gyrations. A target air void of the mixture was approximately 30 percent while the design value was about 27 percent and asphalt binder content (AC) was about 3.0 percent by the weight of dry aggregate. A minimum threshold of the infiltration rate was about 150 inches per hour and a draindown mass was less than about 0.3 percent of the mass.

CCFCM was incorporated in the ATPB to evaluate if volumetric and infiltration properties of the ATPB were affected. Elements of the CCFCM were separated into three different particle size fractions relative to a weight by volume percentage of the ATPB composition. In particular, the plates were shredded and then hammer-milled through a 25.4 millimeter (mm) screen and then processed via mechanical sieving to separate the particles into the different particle size fractions. A particle size fraction of about 1 centimeter (cm) was used in this study, although other particle size fractions are capable of being used depending on the application. Dimensional properties of the particles of the CCFCM used in the study are illustrated in TABLE 2.

TABLE 2

| Category | | Value |
|---|---|---|
| Diameter | | 0.841-2 mm |
| Length | Minimum | 1.14 mm |
| | Maximum | 60.25 mm |
| | Mean | 14.29 mm |
| Mean Aspect Ratio | | 3.75 |

Dimensions of the particles of the CCFCM were measured through a coded image analysis program. Aspect ratio is the ratio of longitudinal dimension to the diameter and ranged from one to sixty with 3.75 as a mean value. Dosage of the CCFCM per total ATPB composition weight was about 0.05 percent and about 0.10 percent, and about one (1) pound per ton and about two (2) pounds per ton, respectively. However, the dosage of the CCFCM per total ATPB composition weight is variable between about 0.01 percent and about 0.25 percent of a total ATPB composition weight.

Once the ATPB composition test specimens were prepared as described herein, the tests on ATPB composition test specimens included theoretical maximum specific gravity ($G_{mm}$), air void, abrasion resistance, porosity, infiltration rate, and draindown effect. Furthermore, abrasion resistance was attempted on a ATPB composition test specimen to measure mass loss in a revolving steel drum after every 100 revolutions, until 300 revolutions was achieved.

In particular, volumetric analysis was performed based on air void and porosity of the ATPB composition test specimens. While air void indicates the total empty space in the ATPB composition, porosity is the effective air void that is interconnected to allow water to enter. Volumetric properties are related to the infiltration performance of the mixture. Air void is calculated using the ratio between the maximum theoretical specific gravity $G_{mm}$ and bulk mixture specific gravity ($G_{mb}$). $G_{mm}$ assumes that there is no air void in the mixture and was tested using uncompacted loose mixture while $G_{mb}$ was tested using compacted gyratory specimen. Calculation of $G_{mb}$ requires the mass of sample in saturated surface dry (SSD) condition, yet it cannot be achieved in an open graded mixture as most of the water will escape once the specimen exits the water batch. Instead, the density (mass/volume) was converted to $G_{mb}$ using a conversion factor in ASTM D3203/D3203M.

Performance of the ATPB composition test specimen was evaluated based on the infiltration rate of the ATPB composition test specimens. The ATPB base course offered higher strength and support for the wearing course compared to unbound materials, while providing rapid drainage of storm water. Infiltration rate testing followed ASTM C1701/C1701M which is designed for testing in the field. A modified method was performed where the diameter of the water entrance was six inches to suit the gyratory ATPB composition test specimen, rather than 12 inches mentioned in the standard. Time between water contacting and completely draining from the top surface of the ATPB composition test specimen was taken. One liter of water was used while maintaining the level of water to be between about 0.4 and about 0.6 inches to control the head of water. Target infiltration rate was at least 150 inches per hour.

As the asphalt binder is in the liquid state at elevated temperatures, the binder will travel to the lower elevation of the mixture. This phenomenon is called the draindown effect and is a design concern especially in open-graded mixtures with high air voids, such as ATPB. The draindown effect occurs, for example, during storage, transportation from the plant to site, and delay between placement and compaction. A steel mesh basket was used during the testing in the laboratory where the loose ATPB composition test specimen was placed in the basket and left in the oven at about 140° C. and about 130° C. for one hour. During the period in the oven, some of the materials in the basket dropped and the percent of mass lost relative to the original mass was measured. According to the specification, less than about 0.3 percent was to be drained after one hour in the oven (ASTM D6390-11, 2017).

Volumetric analysis consisted of evaluating the air void and porosity of the ATPB composition test specimens. TABLE 3 provides $G_{mm}$ results which were used for air void calculation. The design $G_{mm}$ was 2.564 according to the job mix formula (JMF). As seen in TABLE 3, the calculated values showed similar results to the target values.

TABLE 3

| Mix ID | $G_{mm}$ |
|---|---|
| ATPB | 2.589 |
| ATPB05 | 2.555 |
| ATPB 10 | 2.541 |

While the required air void was about 30 percent, the design value was about 27 percent, according to the JMF, and both air void and porosity were around 27 percent (between about 15 percent to about 35 percent air voids). Three specimens were tested for each mixture and the average values along with error bars were reported. About a 2 percent decrease in air voids was observed with the use of CCFCM.

Figure 5:
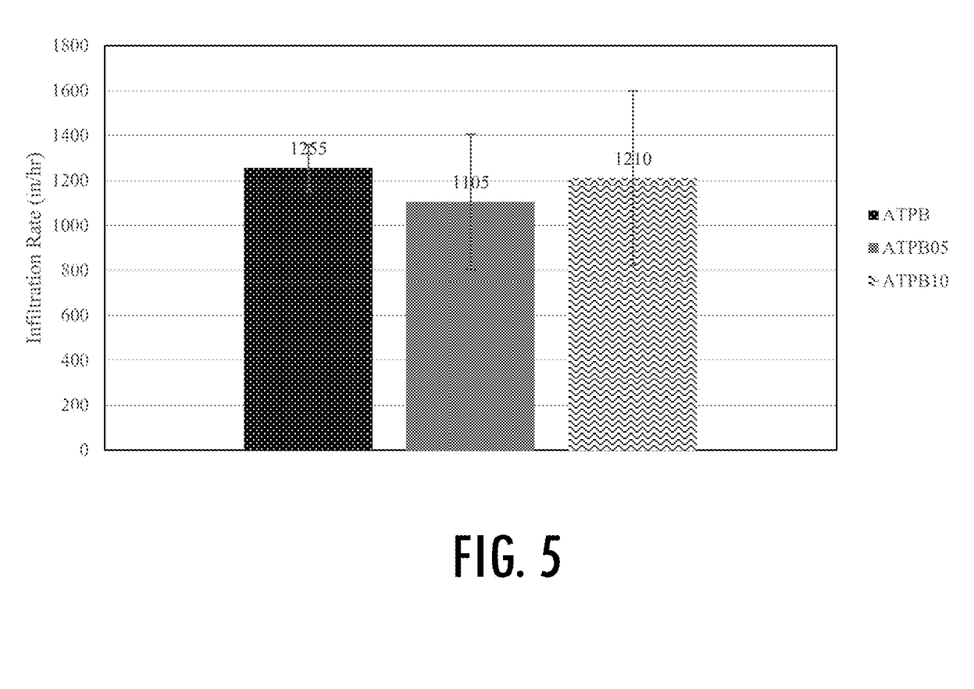
FIG. 5 illustrates a graphical representation of infiltration rate results of an ATPB composition test specimen according to some example implementations of the present disclosure.

Target infiltration rate was determined to be about 150 inches per hour which was easily achieved, as illustrated in FIG. 5. Specifically, FIG. 5 shows that the ATPB composition test specimens resulted in an infiltration rate of between about 200 inches per hour to about 3,000 inches per hour; and specifically about 1,200 inches per hour, which exceeded the target infiltration rate.

Figure 6:
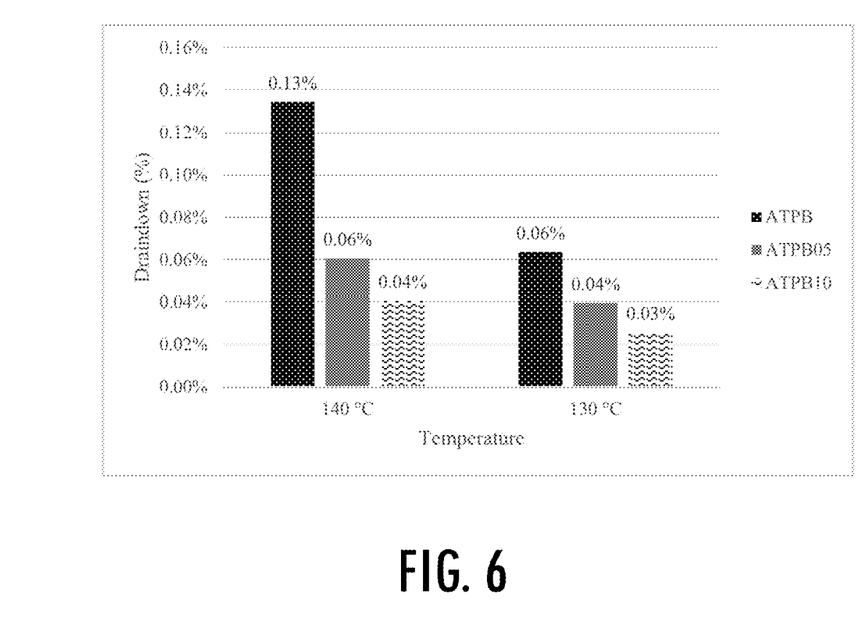
FIG. 6 illustrates a graphical representation of draindown effect results of an ATPB composition test specimen according to some example implementations of the present disclosure.

Draindown effect was tested for the possibility of the binder travelling to the lower elevation of the ATPB composition test specimens and resulting in the ATPB composition test specimens being inhomogeneous in asphalt content. Testing was conducted at about 140° C. and 130° C. and no more than about 0.3 percent was to be drained after one hour of placement in the oven. FIG. 6 shows the draindown results of ATPB composition test specimens at both temperatures. During testing at the higher temperature, ATPB with no CCFCM additive resulted in about a 0.13 percent mass loss. However, incorporating CCFCM with the ATPB reduced the draindown effect and a higher dosage of CCFCM increased the extent of the decrease. Subsequently, testing at about 130° C. resulted in a smaller mass loss in all three specimens. CCFCM was also effective in reducing mass loss at this temperature.

The objective of this study was to evaluate the volumetric, infiltration performance, and draindown effect of the ATPB composition test specimens with and without CCFCM reinforcements. Volumetric analysis, including air void and porosity, resulted within the required design values and were not affected significantly by the incorporation of CCFCM with the ATPB. Infiltration rate showed a similar trend where the requirement was met and CCFCM did not noticeably influence the hydraulic performance. Draindown effect, however, significantly improved with the incorporation of CCFCM. While ATPB without CCFCM incorporated therewith was within the about 0.3 percent mass loss threshold, the incorporation of CCFCM decreased the drained amount and a higher dosage of CCFCM resulted in a decreased mass loss. It can be concluded that using CCFCM as a reinforcement agent for ATPB does not affect the drainage constant of the base course (first layer), but can improve the quality of the overall permeable pavement system as draindown resistance will increase. Further, other mechanical properties, such as compressive strength were increased or maintained at about 5 Megapascal Pressure Units (MPa) to about 30 MPa, while split tensile strength was increased or maintained at about 0.5 MPa to about 5 MPa, when compared against non-reinforced permeable pavement systems.

Figure 7:
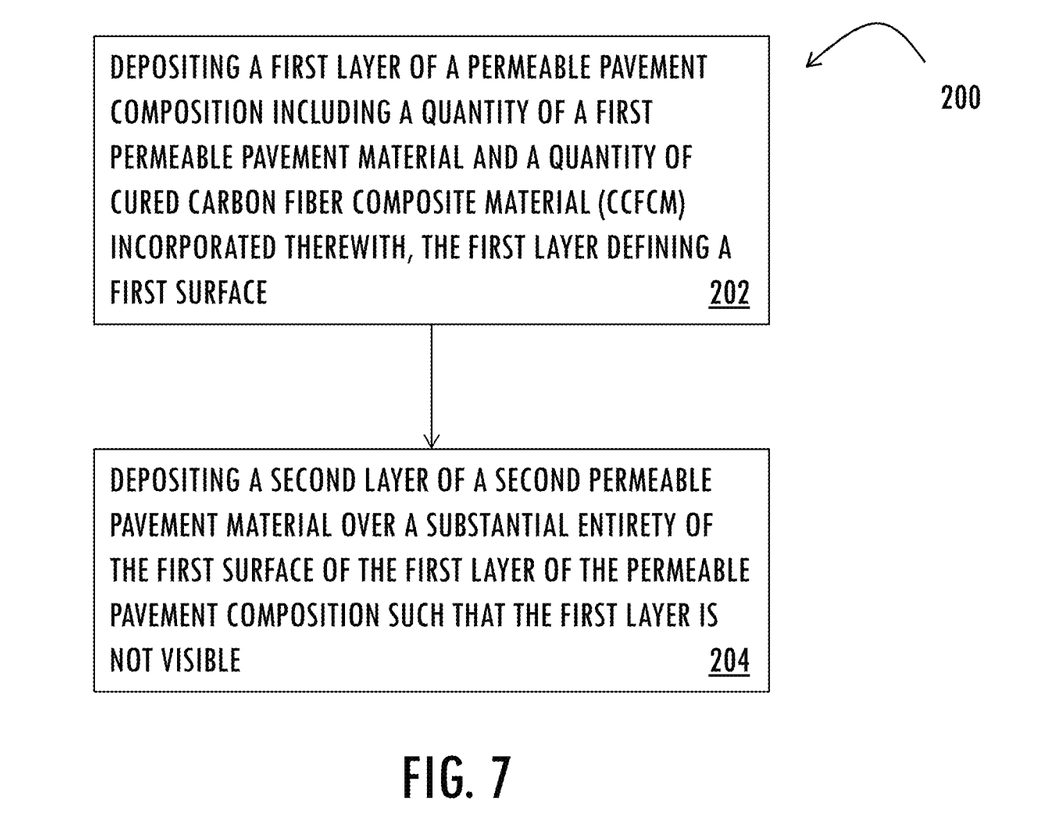
FIG. 7 illustrates a method flow diagram for a method of making a permeable pavement system according to some example implementations of the present disclosure.

Referring now to FIG. 7, a method of making a permeable pavement system, generally designated 200, is illustrated. The method comprises a first step 202 of depositing a first layer of a permeable pavement composition including a quantity of a first permeable pavement material and a quantity of cured carbon fiber composite material (CCFCM) incorporated therewith, the first layer defining a first surface. The method comprises a second step 204 of depositing a second layer of a second permeable pavement material over a substantial entirety of and covering the first surface of the first layer of the permeable pavement composition (i.e., such that the first layer is not visible).

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of making a permeable pavement system comprising:
    depositing a first layer of a reinforced permeable pavement composition comprising a first quantity of a first permeable pavement material and a second quantity of Cured Carbon Fiber Composite Material (CCFCM) particles incorporated therewith, the first layer defining a first surface; and
    depositing a second layer of a second permeable pavement material over the first surface of the first layer of the reinforced permeable pavement composition;
    wherein the first layer strengthens the permeable pavement system;
    wherein the first layer has a water infiltration rate ranging from 200 inches per hour to 3000 inches per hour, as measured by ASTM test standard C1701 at 7 days;
    wherein the second quantity of the CCFCM has a concentration of CCFCM that ranges between 0.15 Vol. percent to 6 Vol. percent of a total volume of the reinforced permeable pavement composition;
    wherein the second quantity of the CCFCM comprises a plurality of CCFCM particles smaller than 3.35 mm, or a plurality of CCFCM particles smaller than 3.35 mm and larger than 2mm, or a plurality of CCFCM particles smaller than 2 mm and larger than 0.841 mm, or a plurality of CCFCM particles smaller than 0.841 mm;
    wherein the first layer has a hardened porosity ranging from 15 Vol. percent to 35 Vol. percent air voids, as measured by ASTM test standard C1754; and
    wherein the first layer comprises reinforced porous asphalt reinforced with the plurality of CCFCM particles; and
    wherein the second layer comprises porous asphalt.

2. The method of making a permeable pavement system according to claim 1, wherein an amount of the second quantity of CCFCM particles in the first layer ranges between about 0.01 weight percent and about 0.25 weight percent of a total mixture weight of the first layer.

3. The method of making a permeable pavement system according to claim 1, wherein the reinforced porous asphalt comprises substantially no amount of fine aggregates.

4. The method of making a permeable pavement system according to claim 1, wherein the first layer comprises porous asphalt comprising 97-95 weight percent of aggregates and 3-5weight percent of asphalt binder, respectively.

5. The method of making a permeable pavement system according to claim 4, wherein an amount of the asphalt binder comprises from 3 weight percent to 9 weight percent of the second quantity of the CCFCM particles.

6. The method of making a permeable pavement system according to claim 1, wherein the second quantity of the CCFCM particles comprises recycled CCFCM.

7. The method of making a permeable pavement system according to claim 1, wherein a ratio of a first thickness of the first layer to a second thickness of the second layer ranges from 1:2 to 4:1.

8. The method of making a permeable pavement system according to claim 1, wherein the second quantity of the CCFCM particles comprises carbon fibers incorporated within a binding polymer.

9. The method of making a permeable pavement system according to claim 1, wherein the CCFCM particles have a particle size equal to about 1 cm.

10. The method of making a permeable pavement system according to claim 1, further comprising:
providing a fourth quantity of a recycled CCFCM material; and
fabricating the second quantity of CCFCM particles by mechanically deconstructing the fourth quantity of the recycled CCFCM material.

11. The method of making a permeable pavement system according to claim 10, wherein mechanical deconstructing the fourth quantity of the recycled CCFCM material produces a plurality of fibrous particles of CCFCM.

12. The method of making a permeable pavement system according to claim 10, wherein mechanical deconstructing the fourth quantity of the recycled CCFCM material does not comprise using a chemical or a thermal decomposition process.

13. A method of making a permeable pavement system comprising:
depositing a first layer of a reinforced permeable pavement composition comprising a first quantity of a first permeable pavement material and a second quantity of Cured Carbon Fiber Composite Material (CCFCM) particles incorporated therewith, the first layer defining a first surface; and
depositing a second layer of a second permeable pavement material over the first surface of the first layer of the reinforced permeable pavement composition;
wherein the first layer strengthens the permeable pavement system;
wherein the first layer has a water infiltration rate ranging from 200 inches per hour to 3000 inches per hour, as measured by ASTM test standard C1701 at 7 days;
wherein the second quantity of the CCFCM has a concentration of CCFCM that ranges between 0.15 Vol. percent to 6 Vol. percent of a total volume of the reinforced permeable pavement composition;
wherein the second quantity of the CCFCM comprises a plurality of CCFCM particles smaller than 3.35 mm, or a plurality of CCFCM particles smaller than 3.35 mm and larger than 2mm, or a plurality of CCFCM particles smaller than 2 mm and larger than 0.841 mm, or a plurality of CCFCM particles smaller than 0.841 mm;
wherein the first layer has a hardened porosity ranging from 15 Vol. percent to 35 Vol. percent air voids, as measured by ASTM test standard C1754; and
wherein the first layer comprises reinforced pervious concrete reinforced with CCFCM particles, and the second layer comprises pervious concrete.

14. The method of making a permeable pavement system according to claim 13, wherein the first layer of reinforced pervious concrete comprises substantially no fine aggregates.

15. The method of making a permeable pavement system according to claim 13, further comprising:
providing a third quantity of recycled CCFCM; and
fabricating a plurality of CCFCM particles by mechanically deconstructing the third quantity of recycled CCFCM into the plurality of CCFCM particles.

16. The method of making a permeable pavement system according to claim 15, wherein mechanical deconstructing the third quantity of recycled CCFCM produces a plurality of fibrous CCFCM particles.

17. The method of making a permeable pavement system according to claim 15, wherein mechanical deconstructing the third quantity of recycled CCFCM does not comprise using a chemical or a thermal decomposition process.

18. A method of making a permeable pavement system comprising:
depositing a first layer of a reinforced permeable pavement composition comprising a first quantity of a first permeable pavement material and a second quantity of Cured Carbon Fiber Composite Material (CCFCM) particles incorporated therewith, the first layer defining a first surface; and
depositing a second layer of a second permeable pavement material over the first surface of the first layer of the reinforced permeable pavement composition;
wherein the first layer strengthens the permeable pavement system;
wherein the first layer has a water infiltration rate ranging from 200 inches per hour to 3000 inches per hour, as measured by ASTM test standard C1701 at 7 days;
wherein the second quantity of the CCFCM has a concentration of CCFCM that ranges between 0.15 Vol. percent to 6 Vol. percent of a total volume of the reinforced permeable pavement composition;
wherein the second quantity of the CCFCM comprises a plurality of CCFCM particles smaller than 3.35 mm, or a plurality of CCFCM particles smaller than 3.35 mm and larger than 2mm, or a plurality of CCFCM particles smaller than 2 mm and larger than 0.841 mm, or a plurality of CCFCM particles smaller than 0.841 mm;
wherein the first layer has a hardened porosity ranging from 15 Vol. percent to 35 Vol. percent air voids, as measured by ASTM test standard C1754; and
wherein the first layer comprises reinforced porous asphalt reinforced with CCFCM particles, and the second layer comprises pervious concrete.

19. The method of making a permeable pavement system according to claim 18, wherein the first layer has a thickness equal to about three inches, and the second layer has a thickness equal to about six inches.

20. The method of making a permeable pavement system according to claim 18, wherein the second quantity of CCFCM particles ranges from 0.15 Vol. percent to 6 Vol. percent of CCFCM particles per total volume of the first layer.

* * * * *